United States Patent [19]

Innes

[11] Patent Number: 5,699,222
[45] Date of Patent: Dec. 16, 1997

[54] APPARATUS AND METHOD FOR PROGRAMMING AND REVIEWING A PLURALITY OF PARAMETERS OF ELECTRICAL SWITCHING DEVICE

[75] Inventor: Mark E. Innes, Asheville, N.C.

[73] Assignee: Eaton Corporation, Cleveland, Ohio

[21] Appl. No.: 557,585

[22] Filed: Nov. 14, 1995

[51] Int. Cl.$^6$ .................................................. H01H 47/22
[52] U.S. Cl. .................................... 361/170; 307/134
[58] Field of Search ................................ 361/170–172; 307/116, 134, 139, 140; 364/706, 709.1, 790.11–709.16

[56] References Cited

U.S. PATENT DOCUMENTS

| | | | |
|---|---|---|---|
| 3,805,096 | 4/1974 | Hamilton, II | 307/116 |
| 3,999,176 | 12/1976 | Kellogg et al. | 340/253 A |
| 4,307,389 | 12/1981 | Slotkowski | 340/661 |
| 4,476,423 | 10/1984 | Mallick, Jr. et al. | 361/29 |
| 4,713,718 | 12/1987 | Quayle | 361/29 |
| 4,736,157 | 4/1988 | Betker et al. | 324/62 |
| 4,747,061 | 5/1988 | Lagree et al. | 361/86 |
| 4,760,364 | 7/1988 | Ostby | 335/132 |
| 4,766,273 | 8/1988 | Butterworth et al. | 200/147 R |
| 4,827,369 | 5/1989 | Saletta et al. | 361/96 |
| 4,870,531 | 9/1989 | Danek | 361/93 |
| 4,963,846 | 10/1990 | Grunert et al. | 335/42 |
| 5,224,011 | 6/1993 | Yalla et al. | 361/93 |
| 5,467,002 | 11/1995 | Brooks | 318/553 |

OTHER PUBLICATIONS

Installation/Configuration Instructions for 42GNP-9000 Diffuse Photoelectric Sensor for DeviceNet™, Publication PA-9412(A), Allen-Bradley, Jul. 1994, 2 pp.

Primary Examiner—Fritz Fleming
Attorney, Agent, or Firm—Larry G. Vandezande

[57] ABSTRACT

An electrical switching device such as a motor starter includes separable contacts; a coil for operating the separable contacts; two light emitting diode indicators having a plurality of states; a pushbutton switch; and a control circuit responsive to the pushbutton switch employing a plurality of parameters for controlling operation of the coil and the indicators, with the control circuit having a setup mode and including a microcomputer for detecting actuation of the pushbutton switch to enter the setup mode, indicating a first one of the states on the indicators corresponding to a first one of the parameters, and detecting de-actuation of the pushbutton switch to indicate a value of the first parameter on the indicators.

23 Claims, 7 Drawing Sheets

APPARATUS AND METHOD FOR PROGRAMMING AND REVIEWING A PLURALITY OF PARAMETERS OF ELECTRICAL SWITCHING DEVICE

BACKGROUND OF THE INVENTION

1. Field of the Invention

This invention relates to an electrical switching device employing a plurality of parameters for control and, more particularly, to a motor starter employing a circuit for programming and reviewing overload relay parameters. The invention also relates to a method for providing a user interface to an electrical switching device and, more particularly, to a method for programming and reviewing a plurality of overload relay parameters.

2. Background Information

Electrical switching devices include, for example, circuit switching devices and circuit interrupters such as circuit breakers, contactors, motor starters and motor controllers. Circuit breakers, which are well-known in the art, are generally used to protect electrical circuitry from damage due to an overcurrent condition, such as an overload fault or a relatively high level short circuit condition. Molded case circuit breakers, for example, include at least one pair of separable contacts which are operated either manually by way of a handle disposed on the outside of the case or automatically by way of an internal trip unit in response to an overcurrent condition.

When the circuit breaker is on, a movable contact assembly is in contact with a stationary or fixed contact assembly. The closed contacts conduct a flow of current between a line terminal and a load terminal. When the circuit breaker trips or is switched off, the movable contact assembly is moved away from the fixed contact assembly, thus, interrupting the flow of current between the line and load terminals. Examples of molded case circuit breakers are disclosed in U.S. Pat. Nos. 4,827,369; and 4,963,846.

Some types of circuit breakers include an electromechanical trip unit which interrupts current flow in two or more modes of operation. The electromechanical trip unit generally senses overload currents of up to about five to six times normal rated current as well as short circuit currents of greater than about ten times normal rated current. Other types of circuit breakers include an electronic trip unit for automatically interrupting the current flow. The electronic trip unit includes current sensors or transformers which respond to an overcurrent condition.

Additional types of circuit interrupters include, for example, contactors, motor starters, motor controllers, lighting controllers, other load controllers and other electromechanical switching devices used for controlling a variety of electrical loads. Electromagnetic contactors, for example, include a plurality of movable electrical contacts which are brought into contact with a plurality of fixed electrical contacts to close the contactor. The movable electrical contacts are separated from the fixed contacts to open the contactor. Examples of contactors are disclosed in U.S. Pat. Nos. 4,760,364; and 4,766,273.

A common type of starter for loads such as motors, lighting, and the like, comprises an electromagnetic contactor with an overload relay. In a motor starter, for example, the purpose of the overload relay is to estimate the heat produced in the motor by line current and "trip" or stop the motor if the retained heat exceeds an acceptable level. The overload relay monitors the load current and trips the contactor open if a persistent overcurrent condition exists. Typically, the overload relay tracks an $I^2t$ characteristic of the load current which is a measure of heating.

Today, it is common for the overload relay to contain a microprocessor which digitally generates the $I^2t$ characteristic. When the calculated $I^2t$ value reaches a trip level, the contactor is tripped open to interrupt the flow of current to the load.

It is known to provide a plurality of dual in-line package (DIP) switches for selecting features of an overload relay. It is also known to utilize a programming device, such as a hand-held or field programmer, to select the features of an overload relay through a local or remote communications link. However, there is room for improvement.

SUMMARY OF THE INVENTION

The present invention is directed to an electrical switching device including separable contacts; an operating mechanism for operating the separable contacts; an indicator mechanism having a plurality of states; a switch mechanism; and a control mechanism responsive to the switch mechanism employing a plurality of parameters for controlling operation of the operating mechanism and the indicator mechanism, with the control mechanism having a setup mode and including a mechanism for detecting actuation of the switch mechanism to enter the setup mode, a mechanism for indicating a first one of the states on the indicator mechanism corresponding to a first one of the parameters, and a mechanism for detecting deactuation of the switch mechanism to indicate a value of the first parameter on the indicator mechanism.

As another aspect of the invention, an electrical switching device includes separable contacts; an operating mechanism for operating the separable contacts; an indicator mechanism having a plurality of states; a switch mechanism; and a control mechanism responsive to the switch mechanism employing a plurality of parameters for controlling operation of the operating mechanism and the indicator mechanism, with the control mechanism having a non-program mode and a program mode, and including a mechanism for detecting actuation of the switch mechanism to enter the program mode from the non-program mode, a mechanism for indicating a first one of the states on the indicator mechanism corresponding to a first one of the parameters, a mechanism for detecting de-actuation of the switch mechanism to indicate a value of the first parameter on the indicator mechanism, and a mechanism for detecting re-actuation of the switch mechanism at least to adjust the value of the first parameter and indicate the adjusted value of the first parameter on the indicator mechanism.

As a further aspect of the invention, a method of providing a user interface to an electrical switching device having a setup mode; including a separable contact mechanism, a switch mechanism and an indicator mechanism having a plurality of states; employing a plurality of parameters for controlling operation of the separable contact mechanism and the indicator mechanism, includes the steps of detecting actuation of the switch mechanism for at least a predetermined first time interval; entering the setup mode of the electrical switching device; indicating one of the states on the indicator mechanism corresponding to one of the parameters of the electrical switching device in the setup mode; detecting de-actuation of the switch mechanism; and indicating a value of the one parameter in the setup mode on the indicator mechanism.

It is an object of the present invention to program a plurality of parameters of an electrical switching device using two indicators and a pushbutton.

It is another object of the present invention to review a plurality of parameters of an electrical switching device using two indicators and a pushbutton.

It is still another object of the present invention to review and program a plurality of parameters of an overload relay using two indicators and a pushbutton.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

As employed herein, the term "parameter" shall expressly include, but not be limited to any analog or digital value, characteristic, configuration parameter, setpoint, state or mode utilized for control and/or monitoring.

Figure 1:
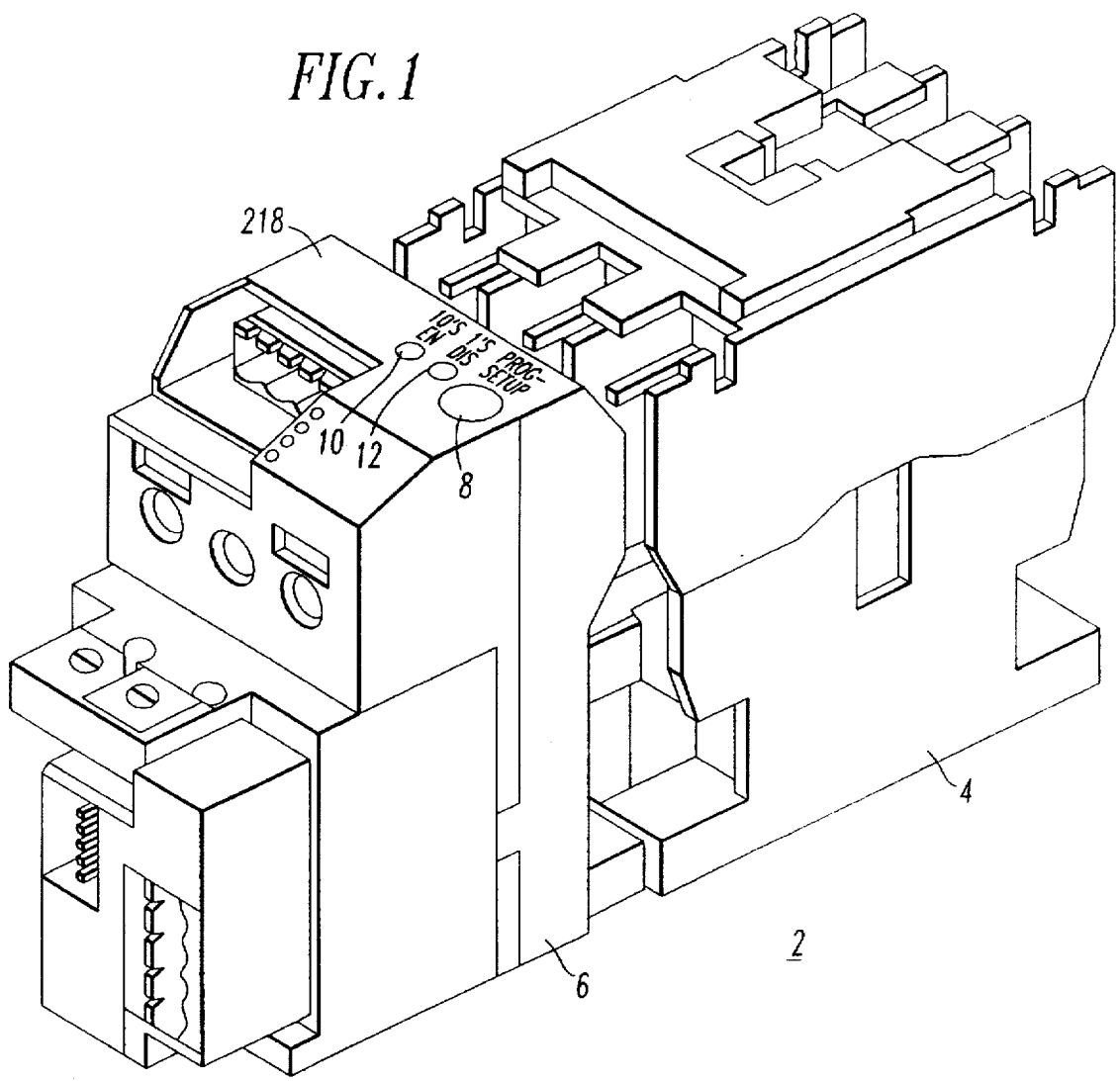
FIG. 1 is an isometric view of a modular electrical contactor and overload relay in accordance with the present invention.

Referring to FIG. 1, a motor starter 2 including a modular electrical contactor 4 and a modular overload relay 6 is illustrated, although the invention is applicable to a wide variety of electrical switching devices including circuit switching devices and circuit interrupters such as circuit breakers, contactors, motor controllers, lighting controllers and other load controllers. The overload relay 6 includes a switch such as membrane pushbutton 8 labelled PROG-SETUP, and two indicators such as light emitting diodes (LED's) 10 and 12 respectively labelled EN (or 10's) and DIS (or 1's), although the invention is applicable to a wide variety of switches and indicators. The modular contactor 4 and overload relay 6 are disclosed in greater detail in concurrently filed, commonly assigned, copending application Ser. No. 05/358,634 entitled "Motor Control System" (Attorney Docket Number 95-ST2-122(DC)).

Figure 2:
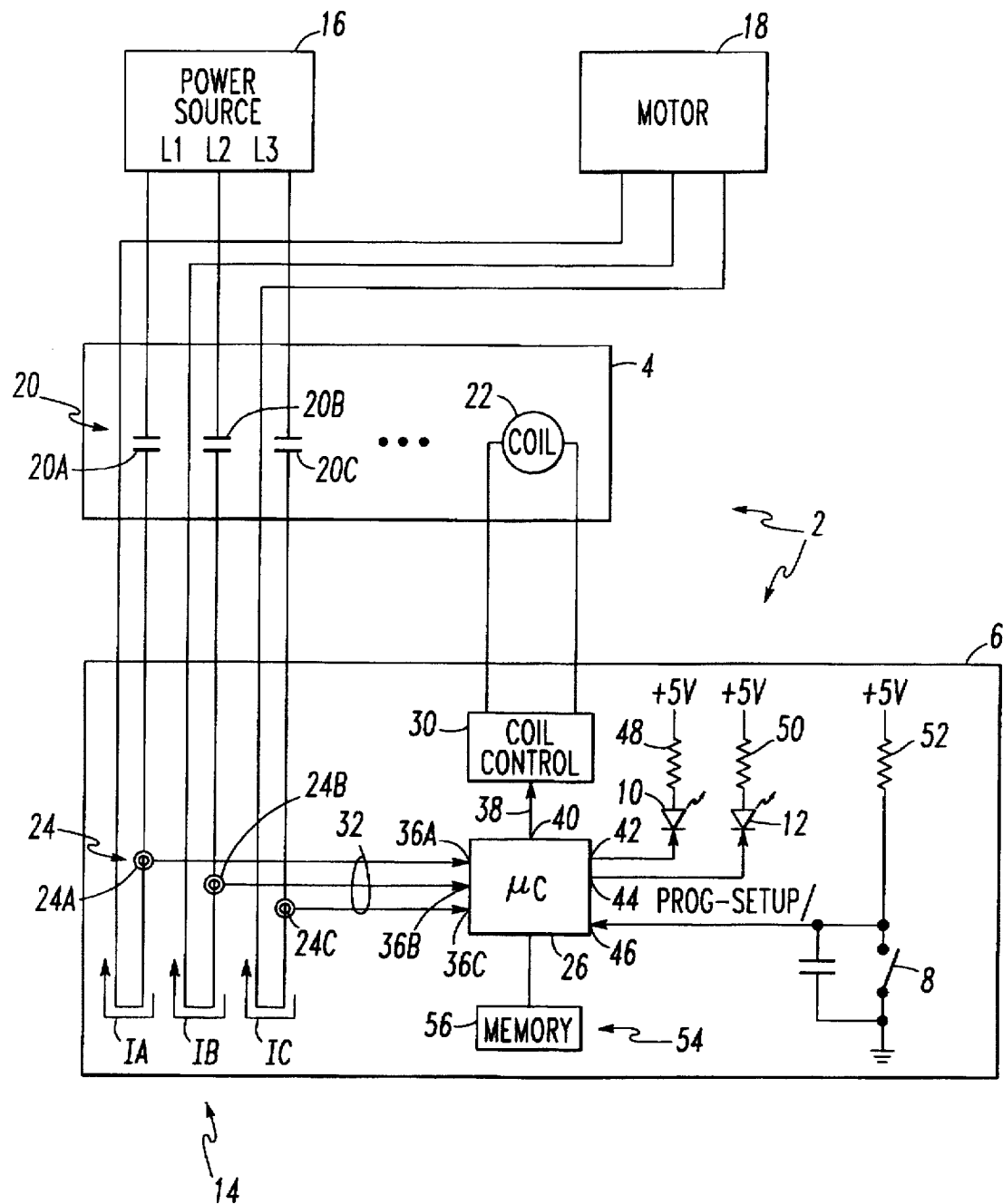
FIG. 2 is a schematic diagram in block form of the electrical contactor and overload relay of FIG. 1 including a microcomputer.

FIG. 2 illustrates an electrical circuit 14 including a three-phase power source 16 having three phases L1,L2,L3, the contactor 4, the overload relay 6 and a three-phase load such as motor 18, although the invention is applicable to a wide variety of electrical circuits, power sources and loads having any number of phases. The exemplary contactor 4 includes separable contacts 20 having separable contacts 20A,20B,20C for the respective phases L1,L2,L3. The separable contacts 20A,20B,20C switch electrical currents IA,IB,IC flowing between the power source 16 and the motor 18. The contactor 4 also includes an operating mechanism such as coil 22 which controls opening and closing of the separable contacts 20.

The exemplary overload relay 6 includes a three-phase current sensor 24, a microcomputer (µC) 26 and a coil control circuit 30. The current sensor 24 includes current sensors such as current transformers 24A,24B,24C which sense the electrical currents IA,IB,IC, respectively, flowing between the power source 16 and the motor 18. The current sensor 24 provides three analog sensed current values 32 to three analog inputs 36A,36B,36C of the microcomputer 26 which converts the analog values 32 to digital values using an analog-to-digital converter (not shown). The microcomputer 26 uses the converted analog values to control the open or closed state of the separable contacts 20 with a control signal 38 on a digital output 40. The digital output 40 is interconnected with the coil control circuit 30 which drives the coil 22.

The microcomputer 26 also has two digital outputs 42,44 and a digital input 46. The microcomputer 26 uses the digital outputs 42,44 to illuminate the LED's 10, 12 by sinking current through resistors 48,50, respectively, which are connected to logic voltage +5V. The microcomputer digital input 46 receives a PROG-SETUP/signal from a resistor 52 connected to the logic voltage +5V. The pushbutton 8, when closed, grounds the low-true PROG-SETUP/signal for input by the digital input 46.

As explained in greater detail below with FIGS. 3A–3E, the microcomputer 26 provides a control mechanism responsive to the pushbutton 8 for the overload relay 6. The overload relay 6 employs various parameters 54 in a memory 56 for controlling operation of the coil 22 and the LED's 10,12. The exemplary parameters 54 are defined below in Table I and are utilized by the microcomputer 26 in controlling the coil 22 and providing overload protection for the motor 18.

The HEATER ($I_{RATED}$) and CLASS parameters are disclosed in greater detail in concurrently filed, commonly assigned, copending application Ser. No. 08/557,587, entitled "Test Circuit for Electrical Switching Device" (Attorney Docket Number 95-ST2-129(DC)). In the PHASE UNBALANCE mode, the microcomputer 26 determines whether one of the currents IA,IB,IC is unbalanced with respect to the other of the currents IA,IB,IC. In the PHASE LOSS mode, the microcomputer 26 determines whether one or more of the phases L1,L2,L3 is unavailable by the absence of one or more of the currents IA,IB,IC for the associated phases. When enabled, the MANUAL/AUTOMATIC RESET mode is used by the microcomputer 26 to perform an automatic reset command after a predetermined cooldown period in order to attempt to automatically close the separable contacts 20 following a thermal trip.

TABLE I

| PARAMETER | DEFINITION |
|---|---|
| HEATER ($I_{RATED}$) | rated load current (e.g., rated motor current) |
| CLASS | time (seconds) to operate at six times rated load current |
| PHASE UNBALANCE | phase unbalance protection enabled/disabled |
| PHASE LOSS | phase loss protection enabled/disabled |
| MANUAL/AUTOMATIC RESET | automatic thermal reset mode enabled/disabled |

As further explained in greater detail below with FIGS. 3A–3E, the LED indicators 10, 12 have various exemplary states associated with reviewing and/or programming the parameters 54. Each of the exemplary LED indicators 10, 12 has an on state, an off state and a flashing state in which the LED indicator is alternately turned on and off. These states are defined below in Table II which illustrates a total of nine (i.e., $3^2$) possible LED states, although only seven are utilized in the exemplary embodiment leaving two spare (e.g., SPARE 1 and SPARE 2) parameters. The HEATER (e.g., 0–99) and CLASS (e.g., 10, 20, 30 or 50) parameters have numerical values with a tens (10's) field and a ones (1's) field, although the ones field of the exemplary CLASS parameter is, by definition, zero. The other parameters have digital values with "enabled" (e.g., true or 1) and "disabled" (e.g., false or 0) states. As shown below, particular LED states associated with a "parameter" or "value" of "- - -" in Table II are not employed by the exemplary embodiment. For example, the exemplary setup mode does not utilize the on states of both of the LED's 10,12.

repeated. On the other hand, whenever de-actuation of the pushbutton 8 is detected at step 82, a count is cleared at step 85. At step 86, if the pushbutton 8 is depressed, execution resumes at step 91. Otherwise, the value of the HEATER parameter is displayed using a series of 10's flashes on LED 10, at step 87, followed by a series of 1's flashes on LED 12, at step 88. For example, if the value of the HEATER parameter is "23," then the 10's LED 10 is flashed two times (i.e., 20) and the 1's LED 12 is flashed three times (i.e., 3). At step 89, the count is incremented and, at step 90, if the

TABLE II

| LED 10 STATE | LED 12 STATE | MODE | PARAMETER | VALUE |
|---|---|---|---|---|
| FLASHING | FLASHING | SETUP | HEATER | 10's, 1's |
| FLASHING | FLASHING | PROGRAM | — | — |
| ON | ON | SETUP | — | — |
| ON | ON | PROGRAM | HEATER 10's | 10's |
| ON | OFF | SETUP | — | — |
| ON | OFF | PROGRAM | HEATER 1's | 1's |
| OFF | ON | SETUP | CLASS | 10's |
| OFF | ON | PROGRAM | CLASS | 10's |
| FLASHING | ON | SETUP | PHASE UNBALANCE | enable/disable |
| FLASHING | ON | PROGRAM | PHASE UNBALANCE | enable/disable |
| ON | FLASHING | SETUP | PHASE LOSS | enable/disable |
| ON | FLASHING | PROGRAM | PHASE LOSS | enable/disable |
| OFF | FLASHING | SETUP | MANUAL/AUTOMATIC | enable/disable |
| OFF | FLASHING | PROGRAM | MANUAL/AUTOMATIC | enable/disable |
| FLASHING | OFF | SETUP | SPARE 1 | — |
| FLASHING | OFF | PROGRAM | SPARE 1 | — |
| OFF | OFF | SETUP | SPARE 2 | — |
| OFF | OFF | PROGRAM | SPARE 2 | — |

Figure 3A:
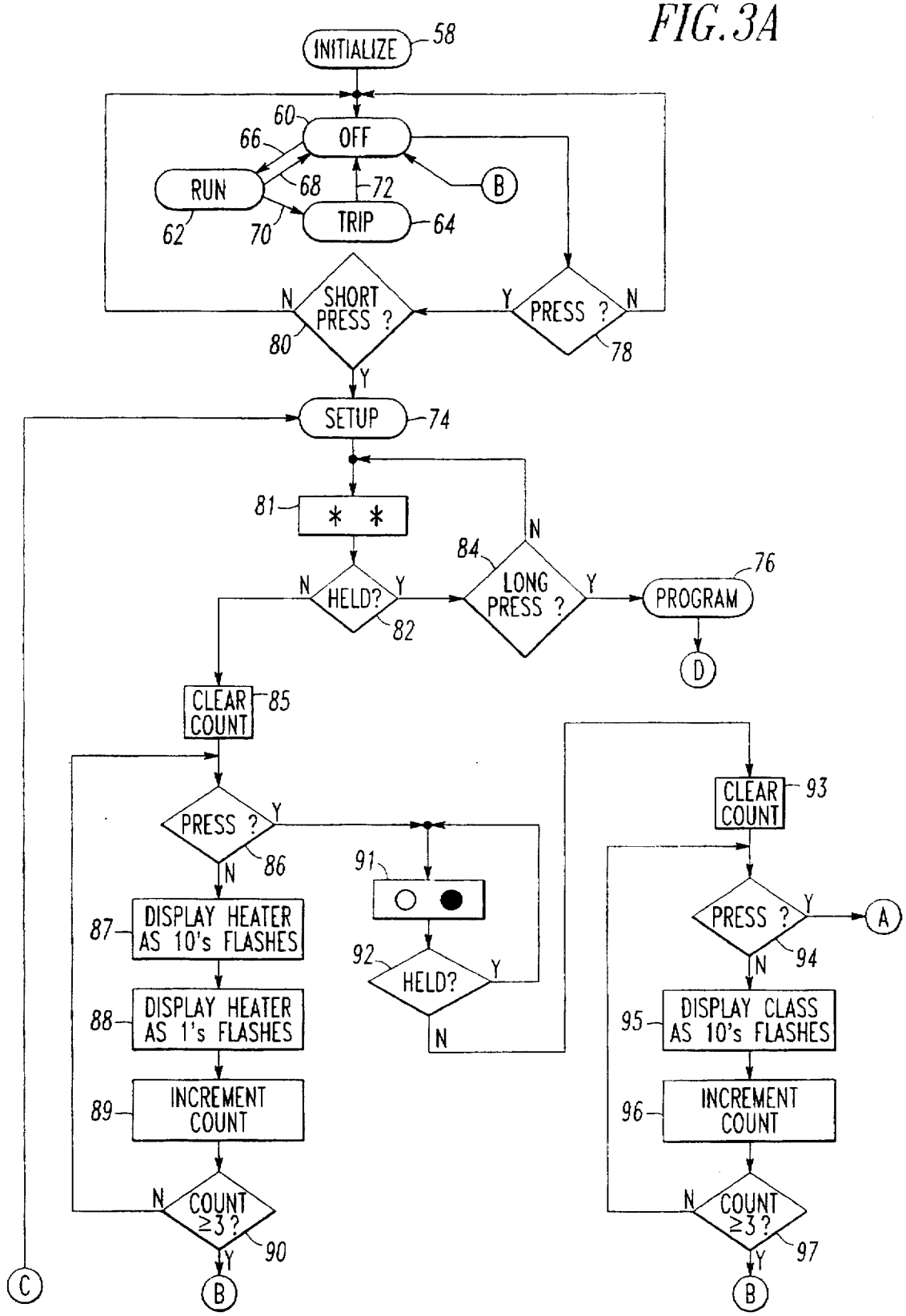
FIGS. 3A–3E are flowcharts of a firmware routine of the microcomputer of FIG. 2.

Also referring to FIG. 3A, a flowchart of a firmware routine of the microcomputer 26 is illustrated. After initialization at step 58, the routine enters an off mode at step 60. The run mode 62 and the trip mode 64 are not part of the present invention. The transition 66 from the off mode 60 to the run mode 62 is in response to a start command (not shown) and the transition 68 from the run mode 62 back to the off mode 60 is in response to a stop command (not shown). In response to the detection of a phase unbalance or a phase loss condition in the currents IA,IB,IC or phases L1,L2,L3 by the microcomputer 26, there is a transition 70 from the run mode 62 to the trip mode 64. The transition 72 from the trip mode 64 to the off mode 60 is in response to a reset command (not shown). The following describes the transitions to and within a review or setup mode 74 and a program mode 76. Any mode, such as the modes 60,62,64, 74, outside of the program mode 76 is a non-program mode.

As part of the off mode 60, at step 78, the microcomputer 26 reads the digital input 46 to determine if the pushbutton 8 is actuated or depressed. If not, step is repeated. Otherwise at step 80, the microcomputer 26 detects whether the pushbutton 8 is still actuated and has been depressed for an exemplary "short" interval of three seconds. If not, step 60 is repeated. Otherwise, if the "short" interval is detected, the setup mode 74 is entered. At step 81, both of the LED's 10,12 are flashed at a predetermined rate such as 4 Hz. This flashing state of both of the LED's 10,12 corresponds to the HEATER setup mode of Table II above. Next, at step 82, the microcomputer 26 determines whether the pushbutton 8 is still actuated and, if so, at step 84, whether the pushbutton 8 has been depressed for an exemplary "long" interval of five seconds, although a wide variety of larger and/or smaller time intervals are possible. If the "long" interval is detected, the microcomputer 26 enters the program mode 76 from the non-program setup mode 74. Otherwise, step 81 is count is less than three, step 86 is repeated. For each of the exemplary flashes, one of the LED's 10, 12 is turned on and off every 300 ms, although a wide variety of rates are possible.

On the other hand, if re-actuation of the pushbutton 8 is detected at step 86, then at step 91, the LED 10 is turned off and the LED 12 is turned on to indicate another state on the LED's 10, 12 corresponding to the CLASS setup mode of Table II above. Whenever de-actuation of the pushbutton 8 is detected at step 92, the value of the CLASS parameter may be displayed. Steps 93,94,95,96,97 are similar to steps 85,86,87,89,90. At step 94, if the pushbutton 8 is depressed, execution resumes at step 98 of FIG. 3B. Otherwise, the value of the CLASS parameter is displayed using a series of 10's flashes on LED 10, at step 95. For example, if the CLASS parameter is "30," the 10's LED 10 is flashed three times (i.e., 30) and the 1's LED 12 is flashed zero times (i.e., 0). In this case, the LED 12 remains off. In a similar manner to the HEATER parameter, user input at step 94 determines whether the step 95 displays the CLASS parameter zero, one, two or three times.

Steps 87–88 and 95 display the value of the HEATER parameter and the CLASS parameter, respectively, as a first series of 10's flashes on the 10's LED 10 and a second series of 1's flashes on the 1's LED 12 (which in the exemplary embodiment is zero flashes for the CLASS parameter).

Figure 3B:
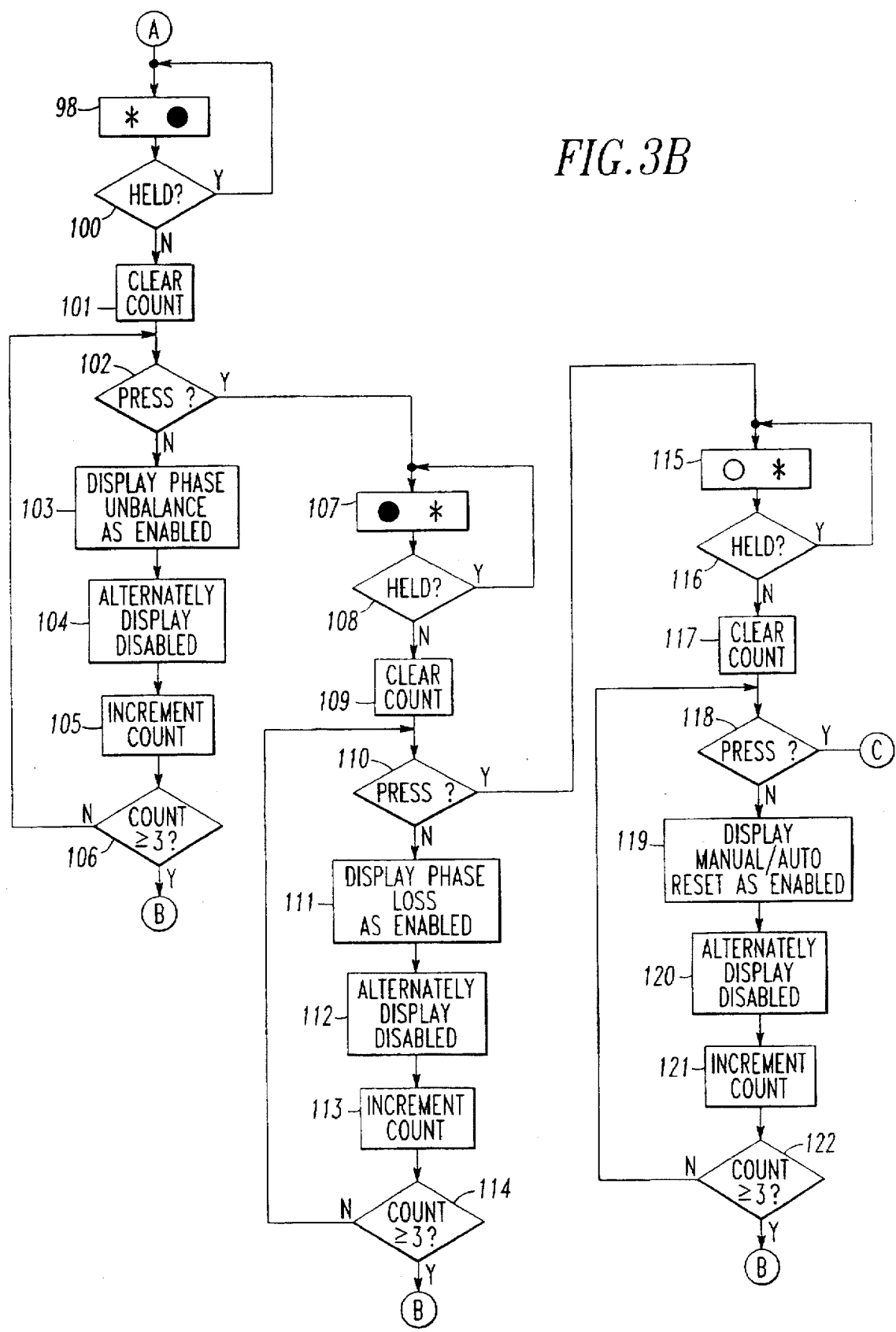

Referring now to FIGS. 2 and 3B, if the pushbutton 8 is depressed at step 94 of FIG. 3A, then at step 98, the LED 10 is flashed at the predetermined 4 Hz rate and the LED 12 is turned on. This corresponds to the PHASE UNBALANCE setup mode of Table II above. Whenever de-actuation of the pushbutton 8 is detected at step 100, the digital value of the PHASE UNBALANCE parameter may be displayed. On the other hand, if the pushbutton 8 is not released at step 100, then step 98 is repeated. Steps 101,102,105,106 are similar to steps 85,86,89,90 of FIG. 3A. Whenever the pushbutton 8 is released at step 102, the digital value of the PHASE UNBALANCE parameter, if enabled, is displayed at step 103 as enabled by lighting LED 10 for an exemplary 2 seconds and then extinguishing the LED 10 for an exemplary 1 second, although a wide variety of on and off periods, including zero, are possible. A similar display is described below with steps 167–169 of FIG. 3D. Alternatively, if disabled, the PHASE UNBALANCE parameter is displayed as disabled at step 104 by lighting LED 12 for an exemplary 2 seconds and then extinguishing the LED 12 for an exemplary 1 second.

Otherwise, if the pushbutton 8 is depressed at step 102, at step 107, the LED 10 is turned on and the LED 12 is flashed at the predetermined 4 Hz rate. This corresponds to the PHASE LOSS setup mode of Table II above. Steps 108, 109,110,111,112,113,114 display the digital value of the PHASE LOSS parameter in a manner similar to steps 100,101,102,103,104,105,106.

If the pushbutton 8 is depressed at step 110, then at step 115, the LED 10 is turned off and the LED 12 is flashed at the predetermined 4 Hz rate. This corresponds to the MANUAL/AUTOMATIC RESET setup mode of Table II above. Steps 116,117,118,119,120,121,122 display the digital value of the MANUAL/AUTOMATIC RESET parameter in a manner similar to steps 100,101,102,103,104,105,106. If the pushbutton 8 is depressed at step 118, the setup mode 74 is repeated. Otherwise, the MANUAL/AUTOMATIC RESET parameter is displayed by repeating, up to three times, the lighting of one of the LED's 10,12 for the exemplary 2 seconds and the extinguishing of such LED for the exemplary 1 second.

Referring to FIGS. 3A and 3B, steps 103,111,119 display the enabled state of the digital value of the PHASE UNBALANCE, PHASE LOSS and MANUAL/AUTOMATIC RESET parameters with the enabled LED 10. Steps 104,112,120 alternatively display the disabled state of the digital value of the PHASE UNBALANCE, PHASE LOSS and MANUAL/AUTOMATIC RESET parameters with the disabled LED 12. Steps 81,91,98,107,115 drive the on, off and flashing states of the LED's 10,12 to represent thereon the five exemplary setup mode parameters of Table II. The exemplary two LED's 10, 12 have a total of nine possible states, with two exemplary states being unused and two exemplary states being used only by the program mode. Those skilled in the art will appreciate that a single LED could be used for three parameters, two LED's could be used for nine parameters, three LED's could be used for 27 parameters, etc. Furthermore, other equivalent embodiments may be provided in which each LED has additional states such as different flashing rates or different colors. In the exemplary embodiment, in which the LED's 10, 12 each have on, off and flashing states corresponding to about one third of the parameters (HEATER, HEATER 10's, HEATER 1's, CLASS, PHASE UNBALANCE, PHASE LOSS and MANUAL/AUTOMATIC RESET (ignoring SPARE 1 and SPARE 2)), each of the microcomputer digital outputs 42,44 drive the on, off and flashing states of the LED's 10,12 to represent thereon about one third of the parameters. For example, with LED 10 flashing, the HEATER and PHASE UNBALANCE (and SPARE 1) parameters are respectively indicated by the flashing and on (and off) states of LED 12.

Referring to FIGS. 2 and 3C–3E, after the program mode 76 of FIG. 3A is entered, at step 123, the LED's 10,12 are both turned on to indicate the state of the LED's 10,12 corresponding to the HEATER 10's program mode of Table II above. Whenever de-actuation of the pushbutton 8 is detected at step 124, a count is cleared at step 125. At step 126, the 10's value of the HEATER parameter is displayed using a series of 10's flashes on LED 10. For example, if the value of the HEATER parameter is "34," then the 10's LED 10 is flashed three times (i.e., 30). At step, 127, if the pushbutton 8 is momentarily pressed and released, then the 10's value of the HEATER parameter is adjusted by incrementing the value at step 128 and step 125 is repeated to clear the display count. On the other hand, if the pushbutton 8 is not momentarily pressed and released at step 127, then at step 129, it is determined whether the pushbutton 8 is pressed and held. If not, at step 131, the display count is incremented and, at step 132, if the count is less than three, step 126 is repeated. Otherwise, after the 10's value of the HEATER parameter is displayed three times with no user input from pushbutton 8, any adjustments of the parameters at steps 128 and 141,155,171,189,207, discussed below, are saved in the memory 56. Otherwise, if the pushbutton 8 is held at step 129, it is determined if the pushbutton 8 is held for an exemplary 5 seconds at step 130. If not, step 129 is repeated. Otherwise, execution resumes, at step 135, and a timer employed by steps 130,134 is cleared. Similarly, if the pushbutton 8 is held at step 124, it is determined if the pushbutton 8 is held for the exemplary 5 seconds at step 134. If not, step 123 is repeated. Otherwise, execution resumes at step 135. In this manner, steps 124,134 facilitate bypassing adjustment of the 10's value of the HEATER parameter by holding the pushbutton 8 for the exemplary 5 second period. Similarly, steps 129,130 facilitate adjustment of the 1's value of the HEATER parameter, after possible adjustment of the 10's value of the HEATER parameter, by holding the pushbutton 8 for the exemplary 5 second period, although a wide variety of time periods are possible.

After step 135, at step 136, the LED 10 is turned on and the LED 12 is turned off to indicate another state of the LED's 10,12 corresponding to the HEATER 1's program mode of Table II above. Steps 137,138,140,142–148 are similar to steps 124,125,127,129–135. At step 139, the 1's value of the HEATER parameter is indicated by displaying a series of 1's flashes on LED 12. For example, if the HEATER parameter is "14," the 1's LED 12 is flashed four times (i.e., 4). After step 140, if the pushbutton 8 is momentarily pressed and released, the 1's value of the HEATER parameter is incremented at step 141 and step 138 is repeated. Steps 126,139 provide a mechanism for displaying the value of the HEATER parameter as a first series of flashes on LED 10 and a second series of flashes on LED 12.

Figure 3C:
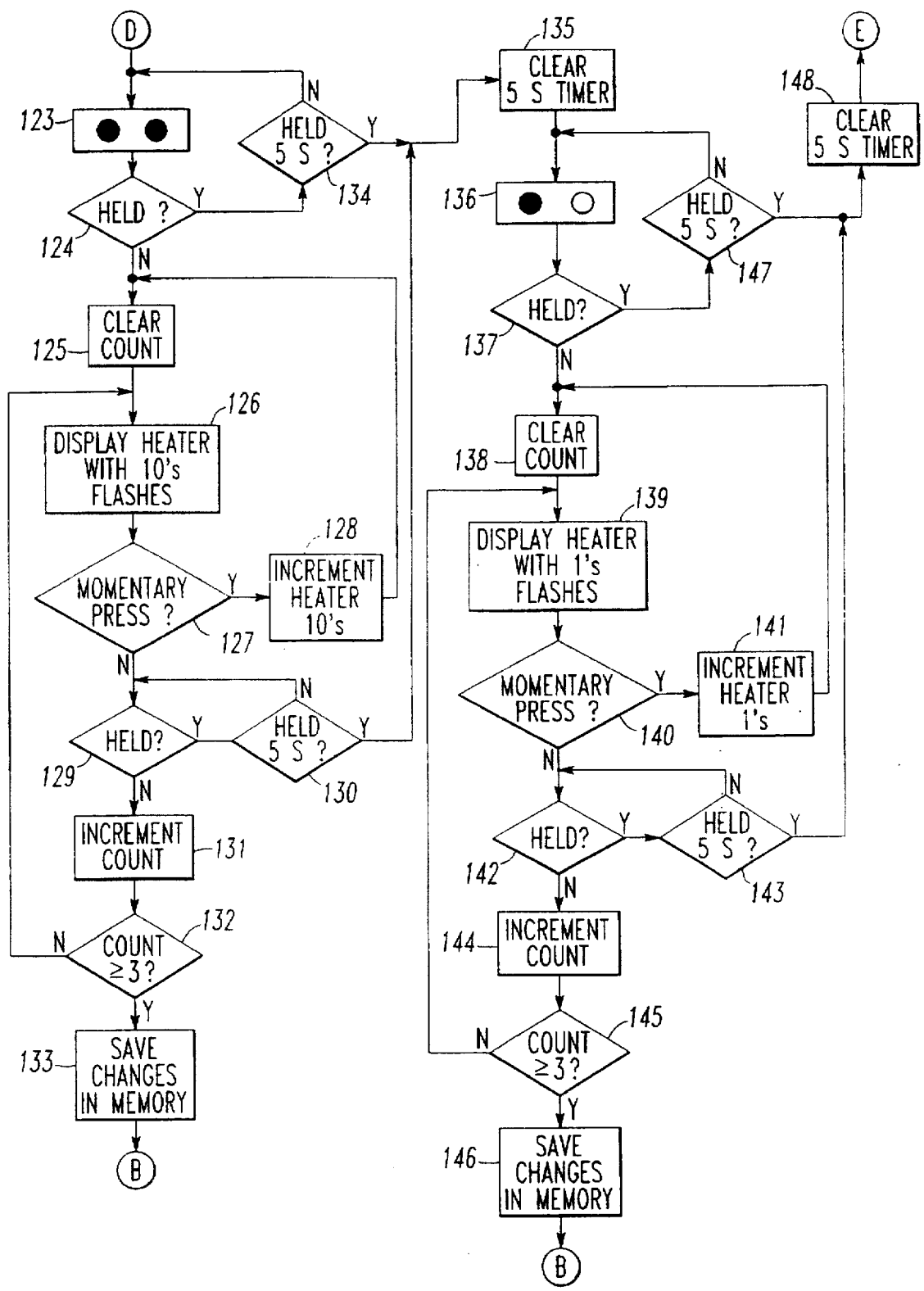
Figure 3D:
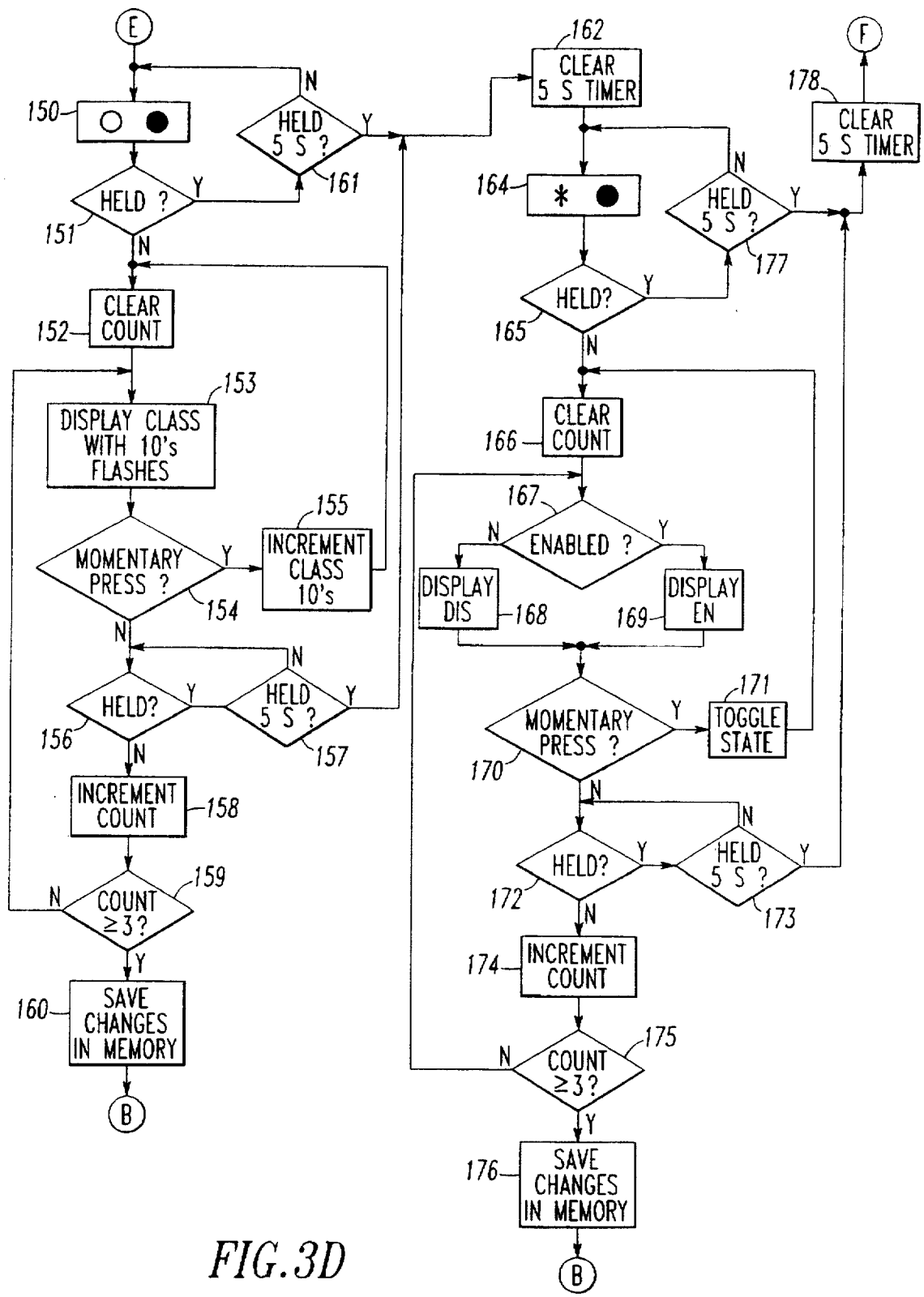

After step 148, at step 150 of FIG. 3D, the LED 10 is turned off and the LED 12 is turned on to indicate another state of the LED's 10, 12 corresponding to the CLASS program mode of Table II above. Steps 151,152,154, 156–162 are similar to steps 124,125,127,129–135 of FIG. 3C. At step 153, the 10's value of the CLASS parameter is indicated by displaying a series of 10's flashes on LED 10. For example, if the CLASS parameter is "10," the 10's LED 10 is flashed one time (i.e., 10). After step 154, if the pushbutton 8 is momentarily pressed and released, the 10's value of the CLASS parameter is incremented at step 155 and step 152 is repeated.

After step 162, at step 164, the LED 10 is flashed at the predetermined 4 Hz rate and the LED 12 is turned on. This corresponds to the PHASE UNBALANCE program mode of Table II above. Steps 165,166,170,172–178 are similar to steps 124,125,127,129–135 of FIG. 3C. At step 167, if the value of the PHASE UNBALANCE parameter is not enabled, then the disabled LED 12 (DIS) is displayed at step 168 as discussed above with step 104 of FIG. 3B. Alternatively, if the value of the PHASE UNBALANCE parameter is enabled, the enabled LED 10 (EN) is displayed at step 169 as discussed above with step 103 of FIG. 3B. Steps 167,168,169 provide a mechanism for displaying the enabled value of the PHASE UNBALANCE digital value with LED 10 and for alternatively displaying the disabled state with the LED 12. At step 170, if the pushbutton 8 is momentarily pressed and released, the enabled/disabled value of the PHASE UNBALANCE parameter is toggled at step 171 and step 166 is repeated.

Figure 3E:
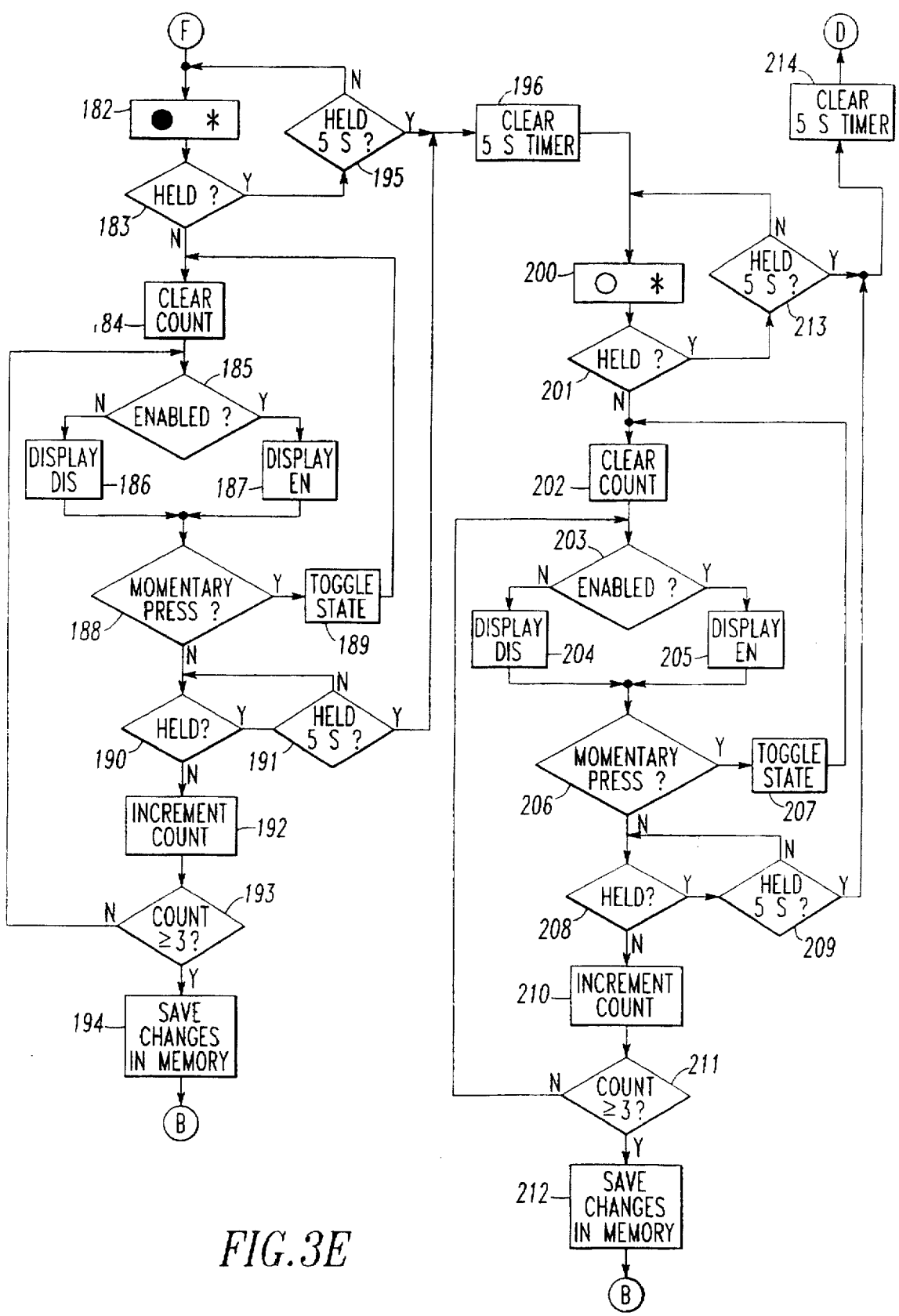

After step 178, at step 182 of FIG. 3E, the LED 10 is turned on and the LED 12 is flashed at the predetermined 4 Hz rate. This corresponds to the PHASE LOSS program mode of Table II above. Steps 183,184,188,190–196 are similar to steps 124,125,127,129–135 of FIG. 3C. Steps 185–187 and 189 for the PHASE LOSS parameter are similar to steps 167–169 and 171 of FIG. 3D for the PHASE UNBALANCE parameter.

After step 196, at step 200, the LED 10 is turned off and the LED 12 is flashed at the predetermined 4 Hz rate. This corresponds to the MANUAL/AUTOMATIC RESET program mode of Table II above. Steps 201,202,206,208–214 are similar to steps 124,125,127,129–135 of FIG. 3C. Steps 203–205 and 207 for the MANUAL/AUTOMATIC RESET parameter are similar to steps 167–169 and 171 of FIG. 3D for the PHASE UNBALANCE parameter. After step 214, step 123 of FIG. 3C is repeated for the HEATER 10's program mode.

As discussed above with FIGS. 3A–3E, a method of providing a user interface to an electrical switching device such as the exemplary motor starter 2 of FIGS. 1 and 2 is disclosed herein. This method includes detecting actuation of the pushbutton 8 for the exemplary "short" time interval at steps 78,80; entering the setup mode of the motor starter 2 at step 74; indicating one of the LED states on the LED's 10,12 corresponding to the exemplary HEATER parameter at step 81; detecting de-actuation of the pushbutton 8 at step 82; and indicating the value of the HEATER parameter on the LED's 10, 12 at steps 87,88. The method further includes employing the program mode 76 and the non-program modes 60,62,64 including the setup mode 74; detecting that the pushbutton 8 has not been actuated for at least a predetermined time interval (e.g., associated with the display, three times, of one of the parameters 54) to enter the off mode 60 at one of steps 90,97,106,114,122; detecting actuation of the pushbutton 8 for at least the exemplary "long" time interval at steps 78,80,82,84; entering the program mode 76; indicating the LED state corresponding to the exemplary 10's value of the HEATER parameter at step 123; detecting de-actuation of the pushbutton 8 at step 124; indicating the 10's value of the HEATER parameter on the LED 10 at step 126; detecting re-actuation of the pushbutton 8 at step 127; adjusting by incrementing the 10's value of the HEATER parameter at step 128; and indicating the adjusted 10's value of the HEATER parameter on the LED 10 at step 126.

Figure 4:
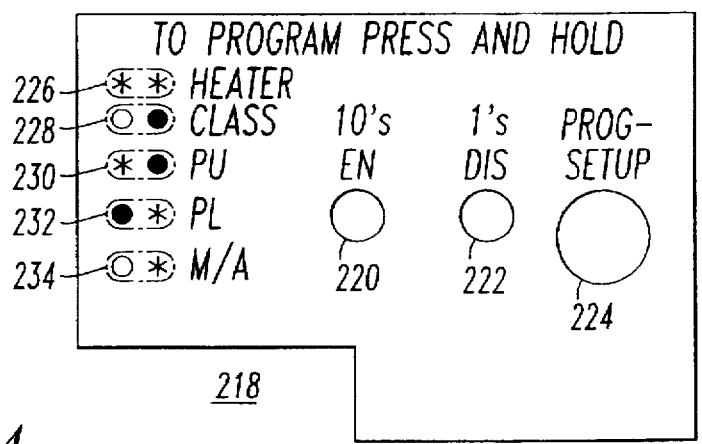
FIG. 4 is a plan view of the front panel of the overload relay of FIG. 1.

Referring to FIG. 4, a plan view of a front panel 218 of the overload relay 2 of FIG. 1 is illustrated. The front panel 218 includes windows 220,222 for the LED's 10,12 respectively, and a tactile membrane 224 for the membrane pushbutton 8. The front panel 218 also includes legends 226,228,230,232,234 which correspond to the HEATER, CLASS, PHASE UNBALANCE, PHASE LOSS and MANUAL/AUTOMATIC RESET parameters, respectively. The legend 226, for example, corresponds to the state (i.e., the HEATER setup mode of Table II) of the LED's 10,12 at step 81 of FIG. 3A in which both LED's 10,12 are flashed at the predetermined 4 Hz rate.

The use of the single pushbutton 8 and the two LED's 10,12 for the display and programming of the parameters 54 of the overload relay 2 provides a compact user interface and reduces the cost, complexity and space compared to known prior art motor control systems. In this manner, the required equipment is minimized while the information conveyed to or from the user is maximized.

It will be appreciated that other equivalent mechanisms for reviewing and/or adjusting the parameters 54 may be provided. For example, an equivalent of step 128 may decrement the 10's value of the HEATER parameter. An equivalent of step 127 may count a plurality of momentary presses of the pushbutton 8 and step 128, in turn, may adjust the 10's value of the HEATER parameter by such count. Steps 82, 124 and 129 may determine whether the pushbutton 8 is not held. Steps 86, 124 and 129 may determine whether the pushbutton 8 is momentarily released. The time periods, and flash rates and periods disclosed herein are exemplary. A wide variety of equivalent periods as well as periodic and aperiodic rates may be provided.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An electrical switching device comprising:

separable contacts;

operating means for operating said separable contacts;

indicator means having a plurality of states; switch means; and control means responsive to said switch means employing a plurality of parameters for controlling operation of said operating means and said indicator means, said control means having a setup mode and including:
means for detecting actuation of said switch means to enter the setup mode,
means for indicating a first one of the states on said indicator means corresponding to a first one of the parameters, and
means for detecting de-actuation of said switch means to indicate a value of the first parameter on said indicator means.

2. The electrical switching device as recited in claim 1 wherein said control means further includes:

means for detecting re-actuation of said switch means to select a second one of the parameters, means for indicating a second one of the states on said indicator means corresponding to the second parameter, and means for detecting de-actuation of said switch means to indicate a value of the second parameter on said indicator means.

3. The electrical switching device as recited in claim 1 wherein said electrical switching device is a motor starter; and wherein said control means further includes an overload relay employing heater, class, phase unbalance, phase loss and manual/automatic reset as at least some of the parameters for controlling operation of said operating means.

4. The electrical switching device as recited in claim 1 wherein said electrical switching device is a motor starter; and wherein said control means further includes an overload relay employing at least one of heater, class, phase unbalance, phase loss and manual/automatic reset as one of the parameters for controlling operation of said operating means.

5. The electrical switching device as recited in claim 4 wherein said indicator means includes a first indicator and a second indicator; and wherein said control means further includes:

means for displaying the value of at least one of the heater and the class as a first series of flashes on the first indicator and a second series of flashes on the second indicator.

6. The electrical switching device as recited in claim 5 wherein said means for displaying the value of at least one of the heater and the class includes:

means for displaying a number of tens in the value of said at least one of the heater and the class with the first series of flashes, and means for displaying a number of ones in the value of said at least one of the heater and the class with the second series of flashes.

7. The electrical switching device as recited in claim 4 wherein said indicator means includes a first indicator and a second indicator; wherein the value of at least one of the phase unbalance, phase loss and manual/automatic reset parameters has a digital value with first and second states; and wherein said control means further includes:

means for displaying the first state of the digital value with one of the first and second indicators, and means for alternatively displaying the second state of the digital value with the other of the first and second indicators.

8. The electrical switching device as recited in claim 7 wherein the digital value is an enabled/disabled value with an enabled state and a disabled state.

9. The electrical switching device as recited in claim 1 wherein said indicator means includes a first indicator and a second indicator; and wherein said control means further includes:

means for displaying a number of tens in the value of at least one of the parameters with a corresponding number of flashes on the first indicator, and means for displaying a number of ones in the value of at least one of the parameters with a corresponding number of flashes on the second indicator.

10. The electrical switching device as recited in claim 1 wherein said indicator means has an on state, an off state and a flashing state, with each of the on, off and flashing states corresponding to about one third of the parameters; and wherein said control means further includes:

means for driving the on, off and flashing states of said indicator means to represent thereon about one third of the parameters for each of said on, off and flashing states.

11. An electrical switching device comprising:
separable contacts;
operating means for operating said separable contacts;
indicator means having a plurality of states;
switch means; and
control means responsive to said switch means employing a plurality of parameters for controlling operation of said operating means and said indicator means, said control means having a non-program mode and a program mode, said control means including:

means for detecting actuation of said switch means to enter the program mode from the non-program mode, means for indicating a first one of the states on said indicator means corresponding to a first one of the parameters, means for detecting de-actuation of said switch means to indicate a value of the first parameter on said indicator means, and means for detecting re-actuation of said switch means at least to adjust the value of the first parameter and indicate the adjusted value of the first parameter on said indicator means.

12. The electrical switching device as recited in claim 11 wherein said means for detecting re-actuation of said switch means includes:

means for alternatively detecting re-actuation of said switch means for a predetermined time interval to indicate a second one of the states on said indicator means corresponding to a second one of the parameters, and means for detecting de-actuation of said switch means to indicate a value of the second parameter on said indicator means.

13. The electrical switching device as recited in claim 12 wherein said indicator means includes a first indicator and a second indicator; and wherein said control means further includes:

means for displaying a number of tens in the value of one of the first and second parameters with the first indicator, and means for alternatively displaying a number of ones in the value of said one of the first and second parameters with the second indicator.

14. The electrical switching device as recited in claim 12 wherein said indicator means includes a first indicator and a second indicator; and wherein said control means further includes means for displaying a number associated with the value of one of the first and second parameters with one of the first and second indicators; and wherein said means for detecting re-actuation of said switch means includes means for detecting momentary actuation of said switch means to adjust said number.

15. The electrical switching device as recited in claim 14 wherein said means for displaying said number associated with the value of one of the first and second parameters includes means for displaying a number of tens in the value of said one of the first and second parameters with the first indicator; and wherein said means for detecting momentary actuation includes means for incrementing said number associated with the value of one of the first and second parameters.

16. The electrical switching device as recited in claim 14 wherein said means for displaying said number associated with the value of one of the first and second parameters includes means for displaying a number of ones in the value of said one of the first and second parameters with the first indicator; and wherein said means for detecting momentary actuation includes means for incrementing said number associated with the value of one of the first and second parameters.

17. The electrical switching device as recited in claim 11 wherein said electrical switching device is a motor starter; and wherein said control means further includes an overload relay employing heater, class, phase unbalance, phase loss and manual/automatic reset as at least some of the parameters for controlling operation of said operating means.

18. The electrical switching device as recited in claim 11 wherein said electrical switching device is a motor starter; and wherein said control means further includes an overload relay employing at least one of heater, class, phase unbalance, phase loss and manual/automatic reset as one of the parameters for controlling operation of said operating means.

19. The electrical switching device as recited in claim 18 wherein said indicator means includes a first indicator and a second indicator; and wherein said control means further includes:

means for displaying the value of one of the parameters as at least one of a first series of flashes on the first indicator and a second series of flashes on the second indicator.

20. The electrical switching device as recited in claim 19 wherein said means for displaying the value includes means for displaying a number of tens in the value of the heater with the first indicator; and means for alternatively displaying a number of ones in the value of the heater with the second indicator.

21. The electrical switching device as recited in claim 18 wherein said indicator means includes a first indicator and a second indicator; wherein the value of at least one of the phase unbalance, phase loss and manual/automatic reset parameters has a digital value with first and second states; and wherein said control means further includes:

means for displaying the first state of the digital value with one of the first and second indicators, and means for alternatively displaying the second state of the digital value with the other of the first and second indicators.

22. A method of providing a user interface to an electrical switching device having a setup mode, said electrical switching device including separable contact means, switch means and indicator means having a plurality of states, said electrical switching device employing a plurality of parameters for controlling operation of said separable contact means and said indicator means, said method comprising the steps of:

detecting actuation of said switch means for at least a predetermined first time interval;

entering the setup mode of said electrical switching device;

indicating one of the states on said indicator means corresponding to one of the parameters of said electrical switching device in the setup mode;

detecting de-actuation of said switch means; and indicating a value of said one parameter in the setup mode on said indicator means.

23. The method as recited in claim 22 further including:

employing a program mode and a non-program mode in said electrical switching device;

detecting that said switch means has not been actuated for at least a predetermined second time interval to enter the non-program mode from the setup mode of said electrical switching device;

detecting actuation of said switch means for at least a predetermined third time interval;

entering the program mode from the non-program mode of said electrical switching device;

indicating one of the states on said indicator means corresponding to one of the parameters of said electrical switching device in the program mode;

detecting de-actuation of said switch means;

indicating a value of said one parameter in the program mode on said indicator means;

detecting re-actuation of said switch means;

adjusting the value of said one parameter in the program mode; and indicating the adjusted value of said one parameter in the program mode on said indicator means.

* * * * *